(12) United States Patent
Cerveny

(10) Patent No.: US 10,894,642 B2
(45) Date of Patent: Jan. 19, 2021

(54) TAMPER-EVIDENT CLOSURE

(71) Applicant: NESTEC S.A., Vevey (CH)

(72) Inventor: Jean-Paul Cerveny, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 202 days.

(21) Appl. No.: 15/744,236

(22) PCT Filed: Jul. 15, 2016

(86) PCT No.: PCT/EP2016/066905
§ 371 (c)(1),
(2) Date: Jan. 12, 2018

(87) PCT Pub. No.: WO2017/013016
PCT Pub. Date: Jan. 26, 2017

(65) Prior Publication Data
US 2018/0208374 A1    Jul. 26, 2018

(30) Foreign Application Priority Data

Jul. 17, 2015   (EP) .................................... 15177383

(51) Int. Cl.
*B65D 55/02* (2006.01)
*B65D 47/06* (2006.01)
*B65D 47/08* (2006.01)
(52) U.S. Cl.
CPC .......... *B65D 55/024* (2013.01); *B65D 47/06* (2013.01); *B65D 47/0804* (2013.01); *B65D 47/08* (2013.01); *B65D 2401/15* (2020.05)

(58) Field of Classification Search
CPC ........ B65D 47/06; B65D 47/08; B65D 55/02; B65D 55/024
See application file for complete search history.

(56) References Cited

U.S. PATENT DOCUMENTS

| 5,829,611 A * | 11/1998 | Beck .................... B65D 55/024 |
| | | 215/252 |
| 6,024,256 A * | 2/2000 | Beck .................... B65D 47/127 |
| | | 222/153.06 |
| 2015/0344196 A1* | 12/2015 | Groubert .............. B65D 55/024 |
| | | 220/265 |

FOREIGN PATENT DOCUMENTS

| EP | 1892194 | 2/2008 | |
| WO | 2015049066 | 4/2015 | |
| WO | WO-2015049066 A1 * | 4/2015 | ........... B65D 55/024 |

* cited by examiner

*Primary Examiner* — J. Gregory Pickett
*Assistant Examiner* — Tia Cox
(74) *Attorney, Agent, or Firm* — K&L Gates LLP

(57) ABSTRACT

A closure (100) for a container (104) comprises a base (106) and a spout (110) disposed upon a mouth of said container (104) and defining a void space (134) between them; a cap (118) which comprises an inner body (124) concentrically disposed within an outer body (122), said cap configured to be disposed on said base (106) so as to seal therewith; and at least one tamper-evident device (136) extending between and locking together said cap (118) and said base (106), said tamper-evident device (136) comprising a flattened member extending from an edge of said inner body member (124) over at least one frangible link (140) and engaging said base (106) such that when the cap (118) is opened said at least one frangible link (140) ruptures, said tamper-evident device (136) consequently falling into and being partially obscured by said void space (134).

17 Claims, 2 Drawing Sheets

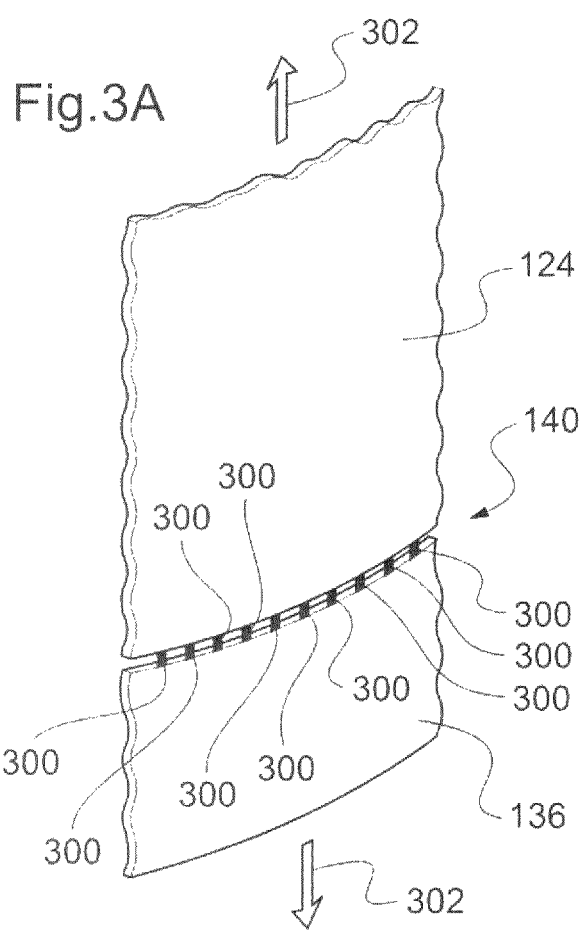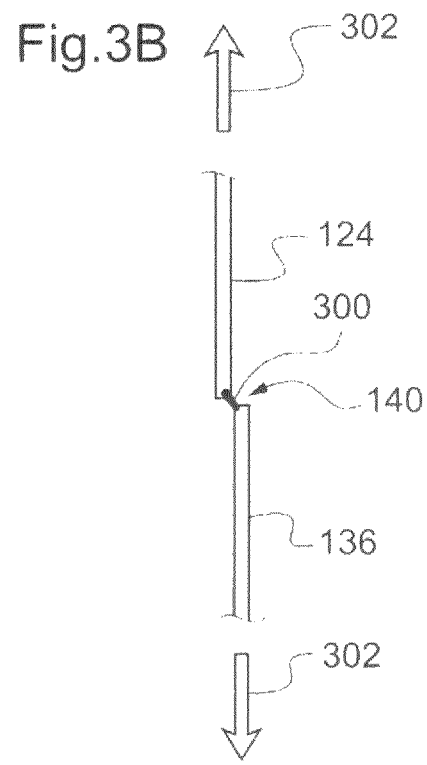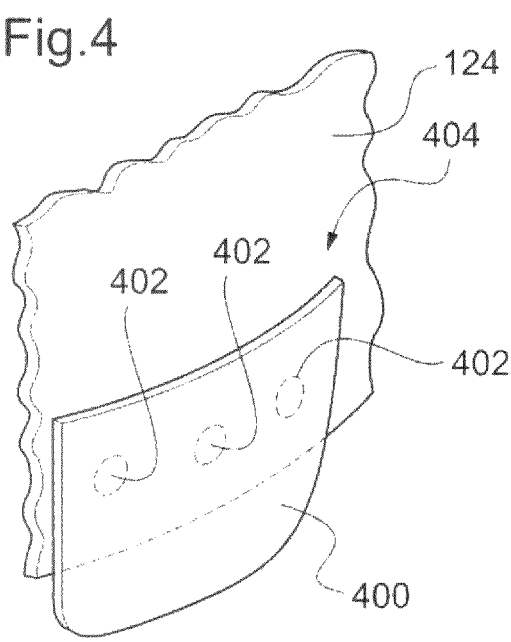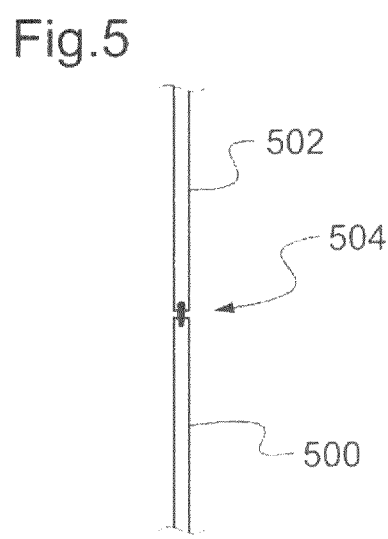

TAMPER-EVIDENT CLOSURE

CROSS REFERENCE TO RELATED APPLICATIONS

The present application is a National Stage of International Application No. PCT/EP2016/066905, filed on Jul. 15, 2016, which claims priority to European Patent Application No. 15177383.5, filed on Jul. 17, 2015, the entire contents of which are being incorporated herein by reference.

FIELD OF THE INVENTION

The present invention concerns a tamper-evident device for a closure of a container, as well as a container incorporating such a tamper-evident device.

BACKGROUND OF THE INVENTION

It has long been known in the packaging arts to provide containers with tamper-evident devices, which provide an indication to the user that the closure of said container has been opened or otherwise compromised.

Of particular importance are those tamper-evident devices employed in packages containing products such as food, beverages, cosmetics, and pharmaceuticals. For products such as these, it is of vital importance to the consumer to know whether the seal of the container has been compromised, as the product may be tainted or spoiled as a result of the container having been opened.

To this end, a tamper-evident device in the form of a frangible seal, membrane, tab, band, ring, or the like is provided, which is irreversibly broken in some way when the container is opened for the first time. Such devices are desirable in that it is difficult, even impossible, to reconstitute the seal and re-close the container once it has been opened.

One type of closure which is of particular interest is the "flip-cap" closure (also commonly known as a "sport cap" closure), which is advantageous in that it is particularly easy to open, even with one hand. However, the flip-open motion of the closure means that the traditional drop-band tamper-evident device, commonly found on screw-cap closures, is of limited utility.

As a result, flip-top closures generally employ a tamper-evident device comprising a frangible tab or band which is torn free from the closure by the user. This is disadvantageous, in that the band, once so detached, is often discarded as litter and may become a choking hazard to small children. It is thus highly desirable to provide a tamper-evident device which is retained with the container.

Several attempts have been made to address this issue, in particular European patent application EP 2 213 584 A1 (EP'584). EP'584 describes a number of different tamper-evident devices for flip-cap closures, all of which drop into a cavity provided in the base of the closure when the cap is lifted, and are at least partially hidden within such cavity.

The closures presented in EP'584 can be further grouped into two types: one type utilises at least one tab or flag connected to the rest of the cap by frangible bridges, such that the tab is moulded into the outer wall of the cap. The other type involves a ring which locks to the cap and to the base and which breaks into two pieces when the closure is opened.

Both of these configurations are disadvantageous, however. In the first group, it is impossible to completely seal the mouth of the container from exposure to the exterior; the window in which the frangible tab is located necessarily results in an opening through the wall of the cap to the outside, possibly allowing contaminants such as dust to pass through to the mouth or nozzle of the container. The use of a ring such as in the second group is equally disadvantageous, in that it while it resolves the sealing issue, it requires additional manipulation and assembly steps to assemble the closure.

It is therefore an object of the present invention to provide an improved flip-cap closure which ameliorates at least some of the difficulties elaborated above.

SUMMARY OF THE INVENTION

To this end, the invention is directed towards a closure for a container, comprising a cylindrical base configured to attach to a mouth of a container; a spout disposed within said base, a void space being defined between said spout and said base, said spout being configured to be disposed upon, and in fluid communication with, said mouth of said container; a cap comprising a top cover, an inner body member extending from a surface of said top cover, and an outer body member extending from an edge of said top cover about said inner body member, said inner body member enclosing said spout and forming a seal therewith when said cap is disposed upon said base; and a tamper-evident device extending between and locking together said cap and said base;

According to a first aspect of the invention, said tamper-evident device further comprises a flattened member extending from an edge of said inner body member opposite said top cover, said tamper-evident device being unified with said inner body member over at least one frangible link configured to rupture when said cap is removed from said base, said tamper-evident device being subsequently retained in and at least partially obscured by said void space.

Such a closure is advantageous in that it provides a tamper-evident closure which is furnished in one single piece, and which maintains the spout in an enclosed, sealed environment.

In this way, a closure with a tamper-evident device may be provided without requiring any additional assembly steps. The possibility of a portion of the tamper-evident device coming loose is also reduced, as there is no frangible ring to be retained with the cap as in the prior-art closures.

Moreover, the fact that the tamper-evident device is moulded as an extension of the inner body member means that there is no crack, slot, window, or other opening in said inner body member. Thus, there is no way for contaminants such as dust to enter into the cap and contaminate the surfaces which may come into contact with the product and/or the user's mouth.

Thus, the closure realizes all the advantages of the various closure types known in the art, while incurring none of their disadvantages.

In a preferred embodiment, each at least one tamper-evident device is unified with to the cap by a plurality of frangible links.

This is advantageous in that the plurality of frangible links reduces the likelihood that the tamper-evident device is inadvertently broken and the closure inadvertently opened. Furthermore, providing the plurality of frangible links makes the cap easier to open: the frangible links will generally break in series, rather than all at once. The security and ease of use of the closure is thereby augmented.

In an embodiment, for each tamper evident device there is provided a viewing window in the outer body member of the cap.

This is advantageous in that the user can determine whether the tamper-evident device is intact without having to open the closure. Moreover, the provision of a window will retain most of the protective qualities of the outer body member without exposing the tamper-evident band or the inner body member to an undesirably-high degree.

Preferably, the at least one tamper-evident device is provided in a colour contrasting that of the cap.

This is advantageous in that the contrast of the tamper-evident device against the closure improves its visibility and makes it easier for the user to determine whether the tamper-evident device is still intact, particularly for those with poor vision. The ease of use of the closure is thereby improved.

More preferably, the viewing window is a moulded or cut-out notch.

In this way, the viewing window can be implemented in the most efficient and cost-effective way possible.

Preferably, the at least one tamper-evident device is fully-obscured by the base when disposed in the void space.

This is advantageous in that the possibility of a user mis-reading the state of the tamper-evident device is greatly reduced, as no part of the latter is visible once the container has been opened.

Preferably, the inner body member and the outer body member of the cap each comprise a substantially cylindrical or prismatic wall.

A closure so configured is advantageous in that it is easy to fabricate while retaining a great deal of structural strength in both the lateral and axial directions.

Moreover, the prism can be provided in an axially-symmetric form, such as a cylinder, thereby facilitating the attachment and re-attachment of the cap to the base by the user.

In a possible embodiment, the tamper-evident device is offset from the inner body member along a lateral dimension of the cap.

This is advantageous in that it will achieve a high degree of sealing of the inner body member to the spout, thereby optimizing the performance of the closure.

In an alternate embodiment, the tamper-evident device is substantially aligned with the inner body member along an axial direction of the cap.

This is advantageous in that a closure in such a configuration is simple and inexpensive to fabricate, as the moulding tooling will be less complex than for configurations where the tamper-evident device is offset from the inner body member.

In a preferred embodiment, the closure further comprises a hinge disposed between the cap and the base and constraining the relative motion thereof, said hinge being disposed substantially opposite said at least one tamper-evident device.

This is advantageous in that the tamper-evident device is positioned directly in the user's line of vision as s/he opens the container. The efficacy of the tamper-evident function of the closure is thereby maximized.

According to a second aspect, the invention is directed towards a method of fabricating a closure as described above, comprising the steps of providing a base, cap, and hinge in a single piece, providing a tamper-evident device, and unifying said tamper-evident device with said cap and said base.

Such a method is advantageous in that the closure is essentially assembled prior to its being attached to the container. There is thus no additional handling or assembly step necessary during the filling and sealing of the container, improving the efficiency and cleanliness of the filling operation.

Preferably, the at least one tamper-evident device is unified with the cap by bi-injection or ultrasonic welding.

Such fabrication techniques are particularly advantageous in that they produce bonds which have predictable rupture strength, in a quick and easy manner.

Most preferably, the method further comprises a step for sealing the closure, wherein the cap is disposed upon the base, the tamper-evident device being thereby engaged with the base.

This is advantageous in that the attachment of the closure to the container also seals the container. The usage of the closure with existing equipment and in existing container fabrication and filling operations is thereby facilitated.

According to a third aspect of the invention, there is provided a package comprising a container and a closure as described above.

In this way, the advantages of the closure of the present invention are implemented in a container.

According to a fourth aspect, the invention is directed to a method for fabricating such a package, comprising the steps of fabricating a closure as enumerated above, and then disposing said closure upon the container.

In this way, the advantages of the closure, and of the container comprising it, are realized in production.

BRIEF DESCRIPTION OF THE DRAWINGS

Additional features and advantages of the present invention are described in, and will be apparent from, the description of the presently preferred embodiments which are set out below with reference to the drawings in which:

FIG. 3A is a perspective detail view of the tamper-evident device of the closure of FIG. 1;

FIG. 3B is a cross-sectional detail view of the tamper-evident device of the closure of FIG. 1;

FIG. 4 is a perspective detail view of a tamper-evident device of a closure according to a second embodiment; and FIG. 5 is a cross-sectional detail view of a tamper-evident device of a closure according to a third embodiment.

DETAILED DESCRIPTION OF THE INVENTION

Figure 1:
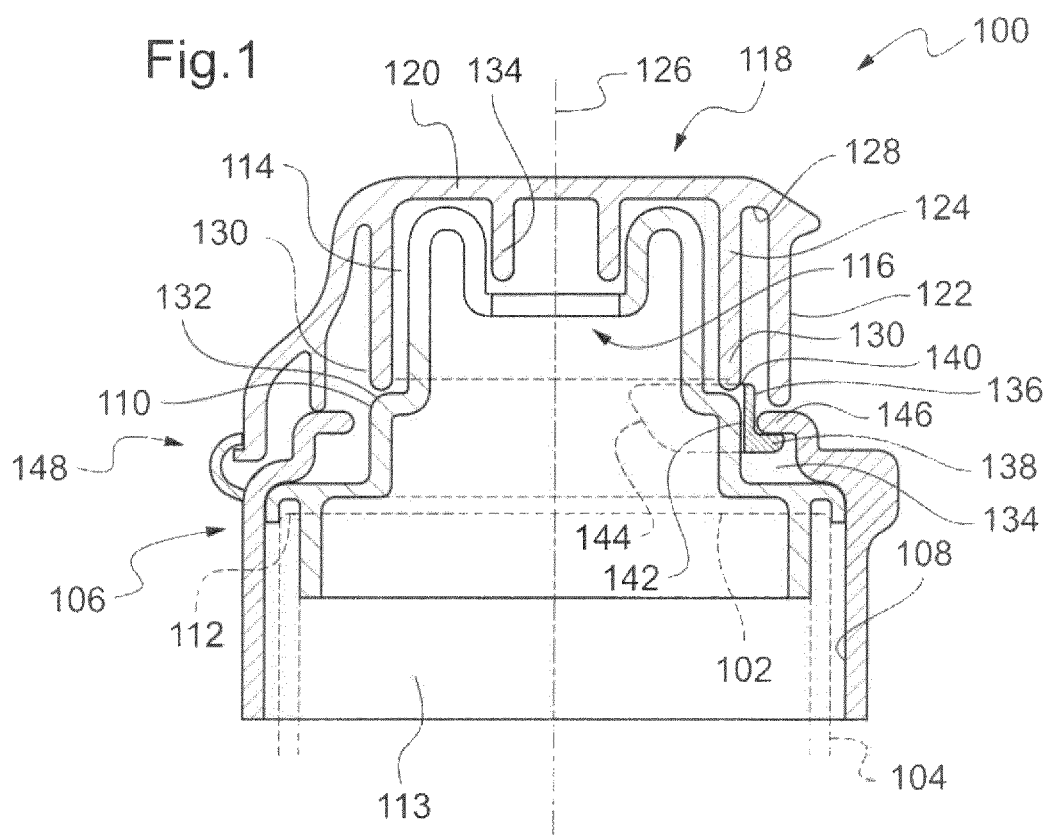
FIG. 1 is a side section view of a closure according to a first embodiment of the invention, in an un-opened state.

FIG. 1 depicts, in a first embodiment of the invention, an exemplary closure 100. The closure 100 is configured to be disposed on a mouth 102 of a container 104 (depicted here in dashed lines).

The closure 100 comprises a base 106, which is a substantially cylindrical body configured to mate with the mouth 102 of the container 104.

The means by which the base is mated to the container may depend on the application, in particular on the construction of the container, the size of the mouth thereof (also known as the "neck finish" of the container), the pressure anticipated within the container, and other such factors as may be pertinent. For example, the base may be attached to the container by such means as threads, snap-fits, interference fits, welding or gluing, or bayonet-type connections.

For instance, while not depicted here for the sake of clarity, the base 106 may be furnished with threads on an interior surface 108, which is configured to mate with a complementary thread on the container 104. However, other means of mating the base to the container, such as friction fits, crimps, retaining rings, etc. may also be envisioned.

The closure 100 further comprises a spout 110. The spout 110 is configured to be disposed upon the container 104, at a rim 112 situated at the mouth of said container 104, such that it is forms an extension of an interior volume 113 of the container 104.

The spout 110 has a substantially conical form, having a wide end disposed upon the container 104 and a narrow end formed by a nipple 114. The nipple 114 is provided with an aperture 116, through which the product held within the container 104 is dispensed. Additionally, a valve (not depicted) at the location of the aperture 116 may be envisioned, so as to control the flow of a liquid product through said aperture 116.

Thus, it will be recognized that when the spout 110 is disposed upon the mouth 102 of the container 104, and the base 106 subsequently attached to the container 104, the base 106 acts to retain the spout 110 in place upon the container 104 and seal it thereto.

The closure 100 further comprises a cap 118, which is here depicted disposed upon the spout 110 and the base 106. The cap 118 broadly comprises three elements: a top cover 120, an outer body member 122, and an inner body member 124.

The top cover 120 is a substantially planar, disc-shaped member, from which the outer body member 122 and inner body member 124 extend. The outer body member 122 is a substantially cylindrical wall which extends from the perimeter of the top cover 120, substantially centred upon an axis 126 of the closure 100.

By "substantially cylindrical," of course, it will be understood that the outer body member need not necessarily have a perfectly circular cross-section, or have walls which are perfectly straight and which meet the top body at right angles. Rather, "substantially cylindrical" may encompass considerable variation in the form of the closure, most particularly in the form of contours provided to improve the ergonomic and stylistic aspects of the closure, as in the outer body member 122 of the cap 118 depicted here.

The inner body member 124 extends from an inner surface 128 of the top cover 120, substantially concentrically about the axis 126 with the outer body member 122, such that the outer body member 122 and the inner body member 124 are nested within each other.

The inner body member 124 and the spout 110 are formed so that, when the cap 118 is disposed on the base 106, the inner body member 124 seals against the spout 110. In the embodiment depicted here in FIG. 1, this is accomplished by the abutment between a distal end 130 of the inner body member 124 and a shoulder 132 furnished in the spout 110. This abutment is present over the entire circumference of the inner body member 124 and spout 110, thereby creating a fluid-tight seal between the two when the closure 100 is closed.

There may also be provided a substantially-cylindrical plug member 134 disposed upon the inner surface 128 of the top cover 120, configured to seal the aperture 116 when the cap 120 is disposed upon the base 106, thereby offering an additional sealing action. Such is particularly advantageous when the container 104 is intended for rough service, or when avoiding leakage of the contents of the container 104 is of particularly acute importance.

It will be readily apparent that the interior surface of the base 106 does not conform exactly to the exterior surface of the spout 110. Rather, there is formed between the two a void space 134.

Of course, the exact configuration of the void space will, naturally, depend on the configuration of the spout 110 and base 106, and need not necessarily extend over the entire circumference of the closure 100 or be uniform in size or shape.

The closure 100 further comprises a tamper-evident device 136, which extends from a portion of the distal end 130 of the inner body member 124. The tamper-evident device 136 also comprises a locking flange 138. The tamper-evident device 136 is attached to the distal end 130 of the inner body member 124 by a frangible link 140, the configuration of which will be discussed in further detail below.

It will be readily understood that a tamper-evident device according to the present invention need not extend around the entire circumference of the closure. Rather, as here depicted by the projection 144, the tamper-evident device 136 may simply extend over only a portion of the circumference of the closure 100. This has the effect of minimizing both the material necessary to fabricate the closure, and the force necessary to break the frangible link 140 when opening the closure 100.

During the initial assembly of the closure 100, the cap 118 is disposed upon the base 106, sealing the inner body member 124 against the spout 110 as discussed above. The tamper-evident device 136 will extend through a slot 142 into the void space 134, with the locking flange 138 engaging a locking shoulder 146 formed in the base 106. The tamper-evident device 136 is maintained in this position by the frangible links 140.

Thus, once the closure 100 is assembled, the tamper-evident device 136 will engage the base 106 and lock the cap 118 in the closed, sealed position depicted here in FIG. 1.

Finally, the closure 100 is provided with a hinge 148, disposed substantially opposite the tamper-evident device 136 across the axis 126. The hinge 148 serves primarily to define the motion of the cap 118 relative to the base 106, as the cap is opened and closed by the user.

With respect to the tamper-evident device 136, this is particularly desirable as it will reduce the relative rotation and lateral shear between the cap 118 and the base 106 when the user seizes said cap 118, ensuring that when the cap is opened the frangible links 140 holding the tamper-evident device 136 to the inner body member 124 break in tension; thus, inadvertent rupture of the frangible links 140 is avoided. The hinge 148 further serves to retain the cap 118 to the base 106 when the closure 100 is opened, improving ease of use.

Figure 2:
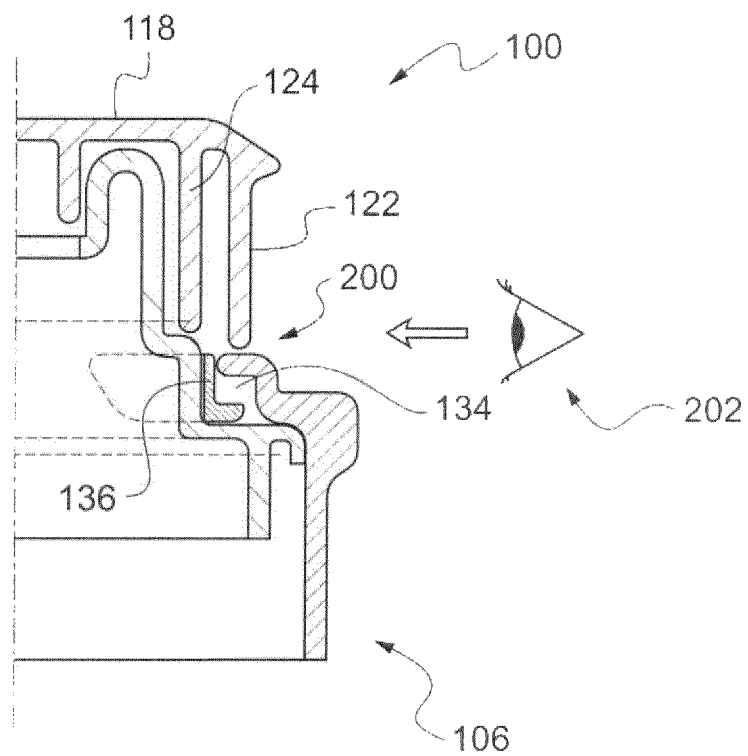
FIG. 2 is a partial side-section view of the closure of FIG. 1, in an opened state.

Turning now to FIG. 2, the operation of the tamper-evident device 136 will now be discussed.

In FIG. 2, the cap 118 is depicted as having been replaced upon the base 106 after having been initially opened. The frangible links between the tamper-evident device 136 and the inner body member 124 having ruptured, the tamper-evident device has fallen into the void space 134, being at least partially obscured therein.

Preferably, the tamper-evident device 136, the base 106, and the spout 110 are configured so that the contours of the void space 134 naturally inhibit the tamper-evident device 136 from falling out of said void space 134 once it has fallen in. This prevents the tamper-evident device 136 from being accidentally discarded as litter or ingested by the user.

The cap 118 is provided with a viewing window 200, here provided in the form of a notch moulded into the outer body member 122 of the cap 118. The viewing window 200 enables a user 202 to inspect the tamper-evident device 136, by looking through said viewing window 200 and verifying that the tamper-evident device 136 is still visible, and determine at a glance whether the closure 100 has been compromised.

Thus, in this case, the user 202 will look through the viewing window 200 and see that the tamper-resistant device 136 is no longer visible, and conclude that the closure 100 has been opened at least once.

Of course, the viewing window may, in other embodiments, be provided in other forms, such as a cut-out, or even in the form of a bi-injected region of clear plastic forming a lens through which the tamper-evident device can be observed. It may even be desirable to fabricate the entire cap, or the entire closure, from a transparent plastic material, to permit the state of the tamper-evident device to be observed.

It will be understood by those skilled in the art that the configuration and form of the tamper-evident device and its frangible link to the cap can be adapted to the particular needs of the application in question. To this end, FIGS. 3A, 3B, 4, and 5 illustrate, in a non-limiting manner, several possible configurations for the attachment between the tamper-evident device and the cap.

The following figures are schematic in nature; thus, for the sake of clarity, certain elements such as locking flanges, shoulders, rims, etc. are omitted from these figures. This does not mean, however, that their absence or presence should be construed as obligating their inclusion in or exclusion from any particular embodiment of the invention.

In FIGS. 3A and 3B, there is provided the frangible link 140 described above. The frangible link comprises a plurality of moulded bridges 300, which are configured to break when a tensile force 302 reaches a pre-determined intensity corresponding to an opening force exerted on the closure by a user.

The moulded bridges 300 are particularly advantageous in that the tamper-evident device 136 may be fabricated as an integral part of the cap during an injection-moulding process. Moreover, by using a bi-injection process, the tamper-evident device 136 may be moulded in a different, contrasting colour from the rest of the closure. In this way, the functionality of the closure is augmented while keeping the cost of its fabrication minimal.

The provision of the frangible link 140 in the form of the plurality of moulded bridges 300 is also advantageous in that for each of the moulded bridges 300 that fractures, the stress exerted on the remaining moulded bridges 300 increases. Thus, when the tensile force 302 is a constant, the tamper-evident device will become more and more yielding as the cap is lifted off of the base.

It can also be seen that the tamper-evident device 136 is offset from the inner body member 124 along a radial direction of the cap, i.e. horizontally when the cap is placed upon the base. This is advantageous in that the lateral offset permits a better sealing between the inner body member 124 and the spout which it abuts when the closure is closed. Moreover, when the tensile force 302 is applied, there will be created in the moulded bridges 300 a bending moment, further favouring the fracture of the frangible link 140 and the separation of the tamper-evident device 136 from the inner body member 124.

FIG. 4 depicts a tamper-evident device 400 according to another embodiment of the invention. The tamper-evident device 400 is unified with the inner body member 124 not by moulded bridges, but by ultrasonic welding, here depicted by a plurality of ultrasonic spot welds 402 which form the frangible link 404.

While solidifying the tamper-evident device by ultrasonic welding may require the tamper-evident device 400 to be fabricated separately from the rest of the closure, this is nonetheless advantageous in that the closure is assembled with the container in a single piece, avoiding the handling and assembly difficulties of the prior art as mentioned above.

Moreover, more complex forms of the tamper-evident device 400 may be achievable by fabricating it separately, than by moulding it integrally with the rest of the closure as in the embodiment discussed in FIGS. 1 through 3B. The user thus realizes a greater deal of flexibility than by fabricating the frangible link 404 by moulding alone.

FIG. 5 discloses yet another possible configuration for a tamper-evident device 500. The tamper-evident device 500 extends from an inner body member 502 by means of a moulded frangible link 504; however, unlike the previously-discussed embodiments, the tamper-evident device 500 is substantially aligned with the inner body member 502, along the axial direction of the cap (i.e. vertically, when the cap is disposed on the base). Such a configuration may be advantageous for certain configurations of the closure where sealing by an interference fit between the inner body member and the side of the spout.

While the embodiments described in the preceding discussion illustrate the invention, it will be understood that variations are possible without departing from the overall scope of the invention.

In particular, it may be advantageous to combine the tamper-evident device described above with other tamper-resistant or tamper-evident devices known in the art.

For instance, it may be desirable to provide the closure with a traditional drop-band tamper-evident device, to provide indication that the closure has not been simply unscrewed from the base while leaving the tamper-evident device in the cap intact.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A closure for a container, the closure comprising:
A cylindrical base configured to attach to a mouth of the container;
a spout disposed within the cylindrical base, a void space being defined between the spout and the cylindrical base, the spout being configured to be disposed upon, and in fluid communication with, the mouth of the container;
a cap comprising a top cover, an inner body member extending from a surface of the top cover, and an outer body member extending from an edge of the top cover about the inner body member, the inner body member enclosing the spout and forming a seal therewith when the cap is disposed upon the cylindrical base; and
at least one tamper-evident device extending between and locking together the cap and the cylindrical base;
the at least one tamper-evident device comprises a flattened member extending from the inner body member at an edge of the inner body member opposite the top cover, the at least one tamper-evident device being unified with the inner body member by at least one frangible link configured to rupture when the cap is removed from the cylindrical base, the at least one tamper-evident device being subsequently retained in the void space and at least partially obscured by the cylindrical base.

2. The closure according to claim 1, wherein the at least one frangible link comprises a plurality of frangible links, each at least one tamper-evident device is unified with to the cap by the plurality of frangible links.

3. The closure according to claim 1, comprising a viewing window defined in the outer body member of the cap for each of the least one tamper-evident device.

4. The closure according to claim 3, wherein the at least one tamper-evident device is provided in a color contrasting that of the cap.

5. The closure according to claim 3, wherein the viewing window is a molded or cut-out notch.

6. The closure according to claim 1, wherein the at least one tamper-evident device is fully obscured by the cylindrical base when the at least one tamper-evident device is disposed in the void space.

7. The closure according to claim 1, wherein the inner body member and the outer body member of the cap each comprise a substantially cylindrical wall.

8. The closure according to claim 1, wherein the at least one tamper-evident device is offset from the inner body member along a lateral dimension of the cap.

9. The closure according to claim 1, wherein the at least one tamper-evident device is substantially aligned with the inner body member along an axial direction of the cap.

10. The closure according to claim 1, comprising a hinge disposed between the cap and the cylindrical base and constraining the relative motion thereof, the hinge being disposed substantially opposite the at least one tamper-evident device.

11. A package comprising a container and a closure, the closure comprising a cylindrical base configured to attach to a mouth of the container,
 a spout disposed within the cylindrical base, a void space being defined between the spout and the cylindrical base, the spout being configured to be disposed upon, and in fluid communication with, the mouth of the container,
 a cap comprising a top cover, an inner body member extending from a surface of the top cover, and an outer body member extending from an edge of the top cover about the inner body member, the inner body member enclosing the spout and forming a seal therewith when the cap is disposed upon the cylindrical base,
 at least one tamper-evident device comprises a flattened member extending from the inner body member at an edge of the inner body member opposite the top cover, the at least one tamper-evident device being unified with the inner body member by at least one frangible link configured to rupture when the cap is removed from the cylindrical base, the at least one tamper-evident device being subsequently retained in the void space and at least partially obscured by the cylindrical base.

12. The closure according to claim 1, wherein the at least one frangible link comprises a first end and a second end opposite the first end, the first end of the at least one frangible link directly coupled to the inner body member, and the second end of the at least one frangible link directly coupled to the at least one tamper-evident device.

13. The closure according to claim 1, wherein a distal end of the inner body member and a shoulder of the spout abut to form the seal when the cap is disposed upon the cylindrical base.

14. The closure according to claim 13, wherein the at least one frangible link comprises a first end and a second end opposite the first end, the first end of the at least one frangible link directly coupled to the distal end of the inner body member, and the second end of the at least one frangible link directly coupled to the at least one tamper-evident device.

15. The package according to claim 11, wherein the at least one frangible link comprises a first end and a second end opposite the first end, the first end of the at least one frangible link directly coupled to the inner body member, and the second end of the at least one frangible link directly coupled to the at least one tamper-evident device.

16. The package according to claim 11, wherein a distal end of the inner body member and a shoulder of the spout abut to form the seal when the cap is disposed upon the cylindrical base.

17. The package according to claim 16, wherein the at least one frangible link comprises a first end and a second end opposite the first end, the first end of the at least one frangible link directly coupled to the distal end of the inner body member, and the second end of the at least one frangible link directly coupled to the at least one tamper-evident device.

* * * * *